United States Patent [19]

Kloster

[11] 4,034,960
[45] July 12, 1977

[54] SPRING COMPRESSOR TOOL

[76] Inventor: Kenneth D. Kloster, 5153 Rambo Lane, Toledo, Ohio 43623

[21] Appl. No.: 634,148

[22] Filed: Nov. 21, 1975

Related U.S. Application Data

[63] Continuation-in-part of Ser. No. 547,918, Feb. 7, 1975, abandoned.

[51] Int. Cl.² .................................. B23P 19/04
[52] U.S. Cl. ............................ 254/10.5; 29/227
[58] Field of Search ................ 254/10.5, 93 R; 29/215–218, 225–227, 252

[56] References Cited

U.S. PATENT DOCUMENTS

| 2,883,742 | 4/1959 | Prath | 254/10.5 |
|---|---|---|---|
| 3,150,859 | 9/1964 | Payne | 29/252 |
| 3,764,107 | 10/1973 | Mlynarczyk | 29/227 |

Primary Examiner—James L. Jones, Jr.
Assistant Examiner—Robert C. Watson
Attorney, Agent, or Firm—Richard D. Emch

[57] ABSTRACT

An improved spring compressor tool for use on, for example, a MacPherson-type independent suspension assembly of a vehicle, without the necessity of removing the suspension from the vehicle. The tool includes upper and lower U-shaped pressure shoes having helical-shaped outer peripheries which define slots for receiving spaced coils of the spring intermediate the opposed connected ends of the spring. At least one of the shoes is linearly adjustable and both shoes are rotatably adjustable for initial alignment with the spaced spring coils. A pair of pneumatic cylinders are positioned side-by-side between the upper and lower shoes. Air pressure is provided through novel valves mounted on a handle for the tool to the cylinders for moving the shoes toward one another to compress the spring and to vent the cylinders for releasing the spring. Return springs are provided in the cylinders to urge the shoes to a non-compressed position during venting. In a modified embodiment of the tool, the lower shoe is replaced with a bench-mounted clamp which engages the suspension assembly below the spring.

14 Claims, 17 Drawing Figures

SPRING COMPRESSOR TOOL

CROSS-REFERENCE TO RELATED PATENT APPLICATION

This is a continuation-in-part of my copending application Ser. No. 547,918, filed Feb. 7, 1975 now abandoned.

BACKGROUND OF THE INVENTION

The need for a tool to compress heavy coil springs is well known in the art. The need for such tools has become even more important since more and more vehicles having independent suspensions are now in use. Many of these vehicles use a MacPherson-type strut suspension which is particularly popular on imported vehicles because of its space saving attributes. The heavy coil springs are compressed and support a substantial part of the vehicle weight. In the after market, the independent suspensions must be serviced, particularly the shock absorber cylinder which in the MacPherson-type independent suspension is located within the heavy coil spring. Often a frame hoist is used, but even when the supporting members engaged by the spring are spaced apart at their maximum distance, the heavy coil spring is often still under a load and must be compressed still further before it can be removed. Mechanical linkages have been used in the prior art to compress the heavy springs, for example the type shown in U.S. Pat. No. 1,342,529. However, many of these prior art tools have been clumsy to use and relatively inefficient.

More recently, bench-type tools, for example the spring compressor shown in U.S. Pat. No. 3,814,382, have been introduced to the marketplace. However, to remove the coil spring from a vehicle and then to insert it into a bench-type tool is time consuming. Manual spring compressors are often used in the initial operation. Because the heavy duty springs are helical in configuration and under load, it is not unusual for the manual tool to slip from the engaged coils of the spring.

SUMMARY OF THE INVENTION

The present invention is directed to a spring compressor tool which may be used to compress a spring in situ. Because the tool compresses the spring in place allowing, for example, the MacPherson-type shock absorber cartridge to then be removed and serviced, the overall garage or servicing operation is reduced substantially over that known in most prior art tools.

The present spring compressor tool includes upper and lower pressure shoes which in a preferred embodiment have generally U-shaped helical outer peripheries which define slots for receiving coils of a loaded coil spring at spaced positions intermediate the opposed and connected ends of the spring. Both shoes are rotatably adjustable and at least one shoe is linearly adjustable to facilitate initial alignment of the shoes with the spaced spring coils. The design of the shoes places the load or force in a direction parallel with the logitudinal axis of the spring even though the load applying shoes are acting on the helical surfaces of spaced coils of the spring. At least one pneumatic cylinder is connected between the upper and lower pressure shoes. A cylinder rod is connected to one of the shoes and mounts a piston which is located in the cylinder. The cylinder rod has a longitudinal passageway which is in communication with a header assembly. The header assembly directs air from a pressurizing valve downwardly through the rod passageway into the cylinder. This drives the upper and lower shoes toward one another to compress the heavy coil spring. The header assembly includes a vent valve which exhausts air from the cylinder to atmosphere and a return spring assembly repositions the upper and lower shoes to their non-compressed position. The vent valve and the pessurizing valve are mounted in a handle for the tool and are designed to provide either a controlled low air flow rate or a high air flow rate.

In a preferred embodiment of the present invention, a pair of side-by-side pneumatic cylinders are utilized. The action of the pair of cylinders aids in preventing torquing of the upper and lower shoes and helps to insure that the force is applied parallel to the longitudinal axis of the spring.

In a modified embodiment of the tool, the lower pressure shoe is replaced with a bench-mounted adapter which clamps onto a shock absorber housing in the MacPherson-type strut suspension system. The remaining upper shoe is both linearly and rotatably adjustable to engage a coil of a loaded spring in the suspension system. The spring is then compressed to permit servicing a shock absorber cartridge without disassembling the entire MacPherson system.

DESCRIPTION OF THE PREFERRED EMBODIMENTS

Figure 1:
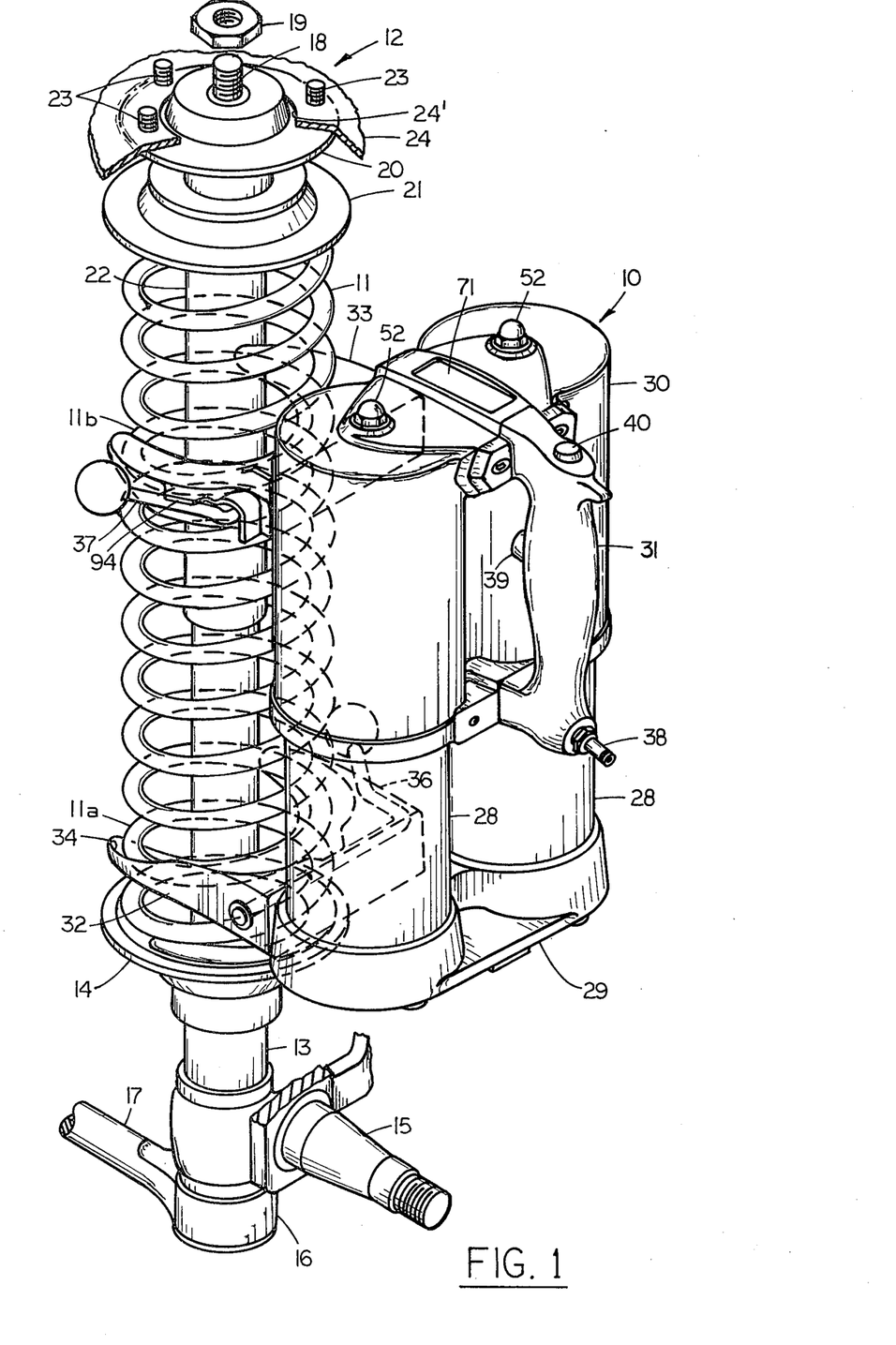
FIG. 1 is a perspective view, partially diagrammatic, showing a spring compressor tool according to the present invention and being used to compress a loaded spring in a MacPherson-type strut suspension.

Referring now to the drawings and particularly to FIGS. 1-4, a spring compressor tool 10 is shown in accordance with the present invention for compressing a heavy coil spring 11 in a MacPherson-type strut suspension assembly 12. The suspension assembly 12 includes a lower shock absorber housing 13 which is connected to a lower spring platform 14, a spindle assembly 15 and, through a spherical ball joint assembly 16, to a suspension track arm 17. At the upper end of the suspension assembly 12, a shock absorber piston rod 18 projects for receiving a retaining nut 19. An upper pivot mount 20, an upper spring platform 21 and a shock absorber dust cover 22 are held onto the piston rod 18 by means of the retaining nut 19. The upper pivot mount 20 includes bolts 23 for attaching the suspension assembly 12 to a vehicle panel 24. When the assembly 12 is assembled, the spring 11 extends between the lower spring platform 14 and the upper spring platform 21 and is maintained in a loaded or semicompressed state. In order to safely disassemble the suspension assembly 12 for replacing the shock absorber, it is necessary to compress the spring 11. As shown in FIG. 1, the compressor tool 10 normally may be connected to the suspension assembly 12 for compressing the spring 11 while the suspension assembly 12 remains in the vehicle.

The compressor tool 10 is pneumatically operated and includes a pair of pneumatic cylinders 28 mounted side-by-side on a lower cylinder bracket 29. An upper housing 30 telescopically fits over the cylinders 28 and includes attached thereto a handle 31 for holding the tool 10. A lower shoe 32 is attached to the lower cylinder bracket 29 and an upper shoe 33 is attached to the upper housing 30. The lower shoe 32 is shaped to define a lower helical slot 34 which provides a close engagement with at least 180° of a spring coil 11a adjacent the lower end of the spring 11. Similarly, the upper shoe 33 is shaped to define a helical slot 35 adapted to engage at least 180° of an upper spring coil 11b near the upper end of the spring 11. As will be discussed in greater detail below, the lower shoe 32 includes a release lever 36 and the upper shoe 33 includes a release lever 37 to facilitate initial alignment of the shoes 32 and 33 with the spring coils 11a and 11b, respectively.

In operation, a source of compressed gas, such as a conventional air compressor of the type normally found in automotive service facilities, is connected to an air inlet connector 38 on the lower end of the handle 31. A pressurizing valve actuator button 39 and a vent valve actuator button 40 are also located on the handle 31. An operator positions the tool 10 with the slot 34 on the lower shoe 32 aligned to engage the bottom of the spring coil 11a and the slot 35 on the upper shoe 33 aligned to engage the top of the spring coil 11b. The pressurizing valve actuator button 39 is then pushed to allow air to enter through the air inlet connector 38 and into cylinders 28. The compressed air entering the cylinders 28 forces the lower cylinder bracket 29 and the upper housing 30 together, thereby compressing the spring 11 between the lower and upper shoes 32 and 33. While the spring 11 remains compressed, the operator services the MacPherson-type strut suspension assembly 12. After the suspension assembly 12 is serviced, the vent valve actuator button 40 is pushed to release the tool 10, returning the spring 11 to its normal position.

Figure 3:
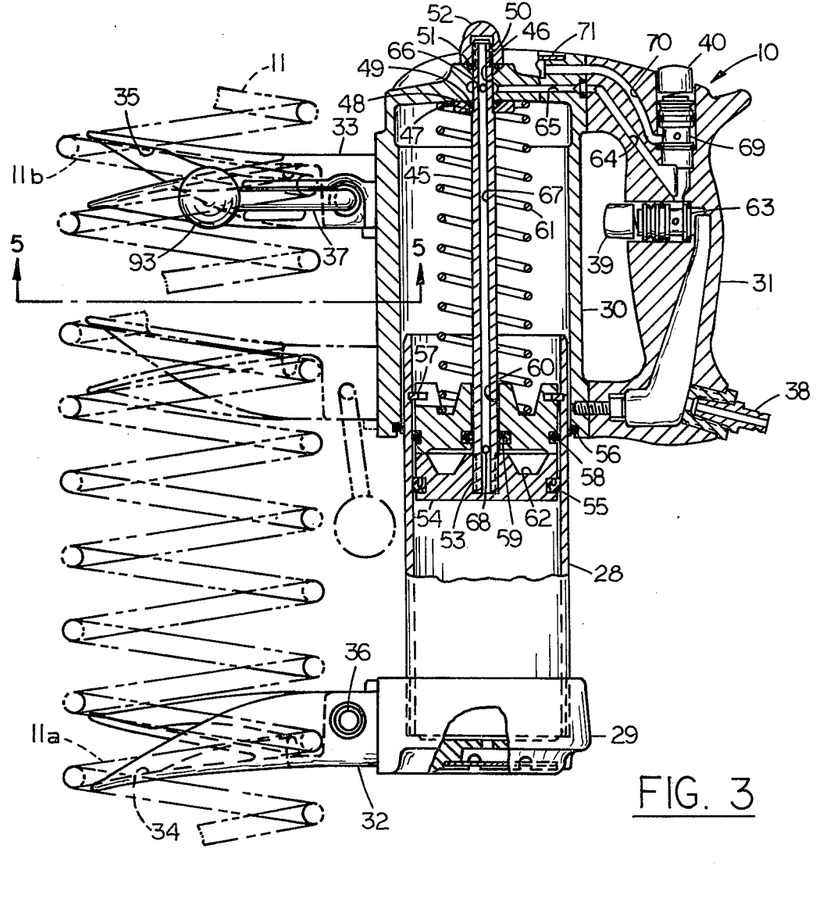
FIG. 3 is a side elevational view, in partial section, showing the spring compressor tool of FIG. 1.
Figure 4:
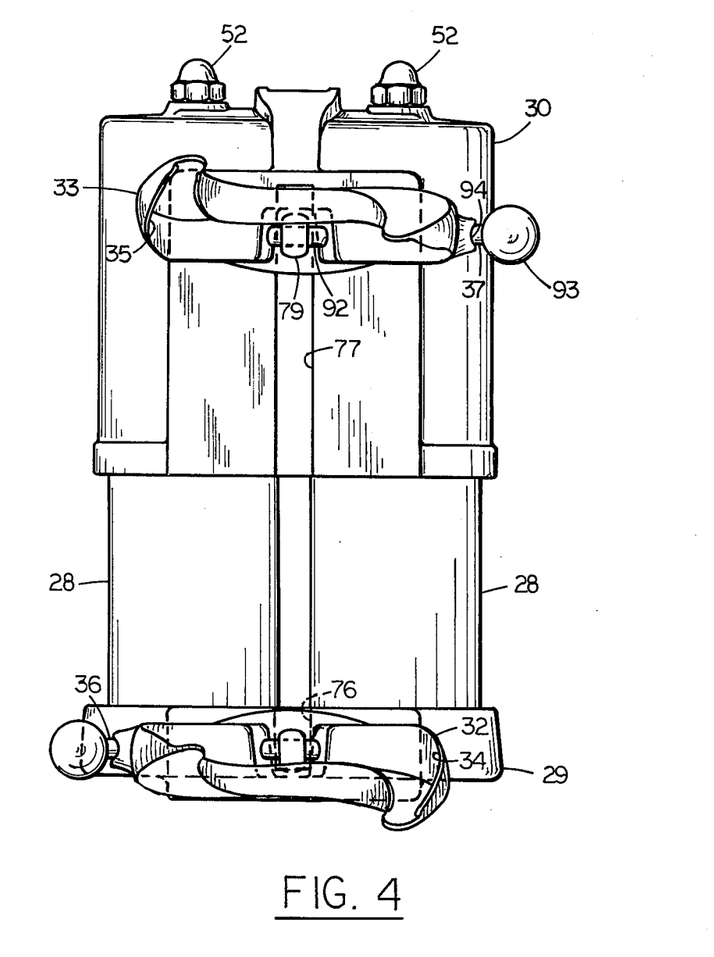
FIG. 4 is a front side elevational view showing the spring compressor tool of FIG. 1.

Referring specifically to FIG. 3, internal structural details are shown for the spring compressor tool 10. For each of the cylinder 28, a piston rod 45 is connected to the upper housing 30 at an opening 46 which is aligned with such cylinder 28. The piston rod 45 includes a step 47 on which a washer 48 an O-ring seal 29 are positioned. A threaded end 50 on the piston rod 45 is then inserted through the opening 46, a seal 51 is positioned on the threaded end 50 and, finally, a cap nut 52 is threaded onto the rod end 50 to rigidly attach the piston rod 45 to the upper housing 30. At a lower end 53 of each rod 45, a piston 54 is attached. The piston 54 is located within a cylinder 28 and includes a seal 55 for engaging the internal wall of the cylinder 28. Above the piston 54, a cap 56 is permanently attached to the internal wall of the cylinder 28 by means of an annular retainer ring 57. An O-ring seal 58 is provided between the cap 56 and the internal wall of the cylinder 28 and a second seal 59 is provided between an internal opening 60 through the cap 56 and the piston rod 45. A coil spring 61 extends around the piston rod 45 between the cap 56 and the upper housing 30 to urge or bias the upper housing 30 to its extended or released position, as shown in FIG. 3.

Figure 2:
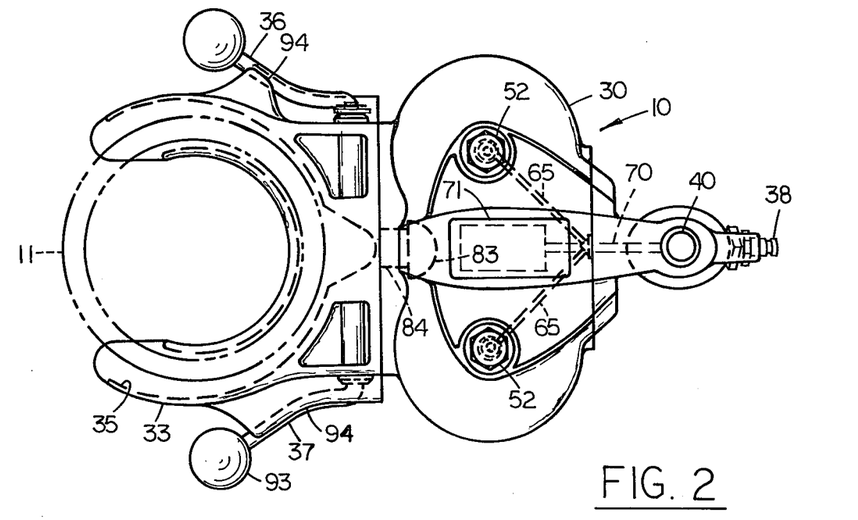
FIG. 2 is a top plan view of the spring compressor tool shown in FIG. 1.

An expansion chamber 62 is formed between the piston 54 and the cap 56. When the tool 10 is actuated to compress the spring 11, compressed air is forced into the expansion chamber 62 to force the piston 54 and the cap 56 apart, in turn moving the shoes 32 and 33 together. During actuation, compressed air flows from an external source through the air inlet connector 38 and a pressurizing valve 63 which is actuated by the button 39. From the valve 63, the compressed air flows through a passageway 64 in the handle 31, through an air distribution passageway 65 in the upper housing 30, through a port 66 which communicates with a passageway 67 leading downwardly through the piston rod 45, and finally through a second port 68 in the piston rod leading from the passageway 67 to the expansion chamber 62. The seals 49 and 51 prevent air leakage between the housing 30 and the piston rod 45. As the compressed air enters the expansion chamber 62, it forces the piston 54 and the cap 56 apart. At the same time, the cylinder 28 telescopes into the upper housing 30, thereby moving the shoes 32 and 33 together. As best seen in FIG. 2, the compressed air passageway 64 in the handle 31 communicates with two similar distribution passageways 65 in the upper housing 30 for simultaneously supplying the compressed air to similar expansion chambers 62 in each of the cylinders 28 for simultaneous and equal actuation of the cylinders 28.

After the tool 10 is actuated to compress the spring 11 and the MacPherson-type strut suspension assembly 12 is serviced, the tool 10 is released through actuation of the vent valve actuator button 40. The button 40 is connected to a vent valve 69 which is mounted within the handle 31. The vent valve 69 is located between the passageway 64 and a passageway 70 which is vented through a filter 71 to the atmosphere. When the button 40 is pressed to actuate the valve 69, air within the expansion chamber 62 in each cylinder 28 is vented through the port 68, the piston rod passageway 67, the port 66, the passageways 65 and 64, the valve 69, the passageway 70 and the filter 71 to the atmosphere. Air is forced from the expansion chamber 62 when the vent valve 69 is actuated through forces exerted by both the return spring 61 and the compressed coil spring 11. The return spring 61, however, exerts sufficient force to return the tool 10 to its normal unactuated position in the event that the tool 10 is actuated without a spring located between the lower and upper shoes 32 and 33.

Figure 5:
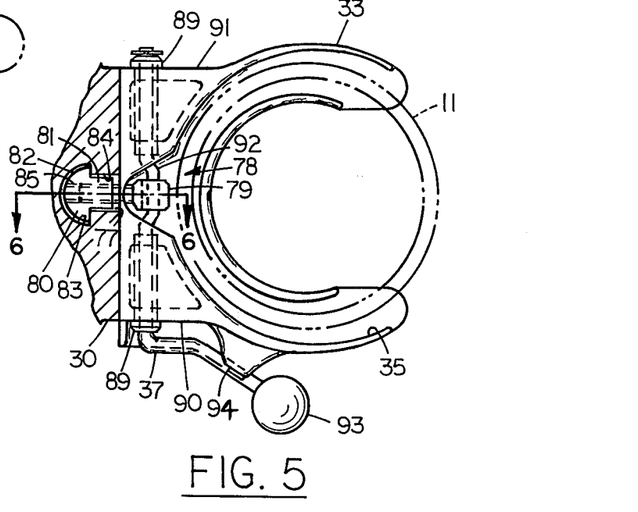
FIG. 5 is a cross-sectional view taken along line 5—5 of FIG. 3.
Figure 6:
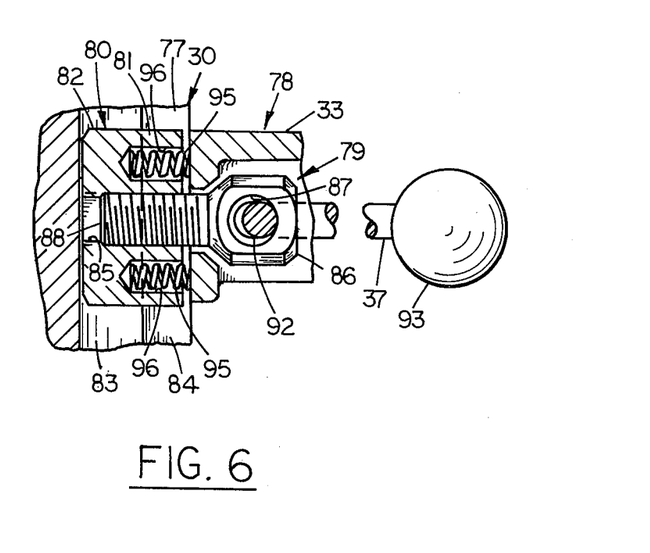
FIG. 6 is an enlarged cross-sectional view taken along line 6—6 of FIG. 5 and showing the upper shoe in a locked position.
Figure 7:
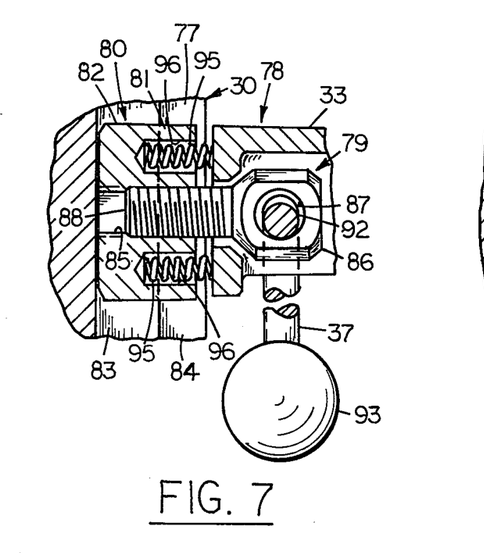
FIG. 7 is a cross-sectional view, similar to FIG. 6, and showing the upper shoe in a released position.

Both the lower shoe 32 and the upper shoe 33 are adjustable to facilitate alignment with the spring coils 11a and 11b, respectively. The lower shoe 32 is rotatably adjustable so that the slot 34 engages the lower surface of the spring coil 11a substantially throughout the length of the slot 34. Similarly, the upper shoe 33 is rotatably adjustable such that the slot 35 engages the upper surface of the spring coil 11b substantially throughout the length of the slot 35. Furthermore, the upper shoe 33 is linearly adjustable towards and away from the lower shoe 32 to facilitate positioning the shoes 32 and 33 between coils of the spring 11 when the tool 10 is in its released or unactuated state. The means for adjusting the shoes 32 and 33 is shown in detail in FIGS. 4-7. FIGS. 5, 6 and 7 will be described specifically in reference to the upper shoe 33. However, it should be appreciated that the upper shoe 33 and the lower shoe 32 may be identical and merely inverted for engaging opposite sides of the spring coils. The lower shoe 32 is mounted in slot 76 in the cylinder bracket 29. Since the lower shoe 32 only need be rotatably adjustable, the slot 76 is only of sufficient length for receiving and holding the lower shoe 32. The upper shoe 33 is mounted in an elongated slot 77 in the upper housing 30. The slot 77 is of a length sufficient to permit lineal adjustment of the upper shoe 33 over a distance greater than the maximum spacing between two adjacent coils on the spring 11.

Referring specifically to FIG. 5-7, details are shown for the upper shoe 33 and the locking mechanism 78 which retains the upper shoe 33 in the slot 77. It should be appreciated that in reviewing these figures that the details may be identical for the lower shoe 32 and the manner in which it is mounted in the slot 76. The locking mechanism 78 includes a bolt 79 which engages a T-nut 80 located in the slot 77. The T-nut 80 includes a shank portion 81 and a head portion 82. The elongated slot 77 has a T-configuration corresponding to the cross section of the T-nut 80 and includes an enlarged width portion 83 for receiving the nut head 82 and a narrower portion 84 for receiving the nut shank 81.

Figure 8:
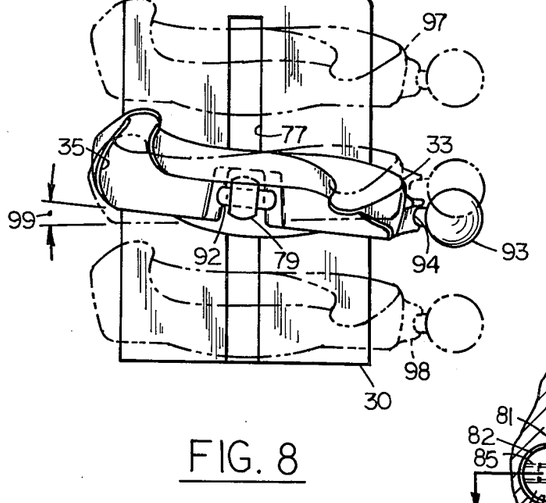
FIG. 8 is a fragmentary front side elevational view of the tool of FIG. 1 and showing the range of linear and rotational adjustments for the upper shoe.

The bolt 79 is threaded into a threaded opening 85 in the T-nut 80. The bolt 79 includes an enlarged head 86 having an opening or eye 87 extending there through in a direction perpendicular to the threaded end 88 which engages the T-nut 80 for receiving the release lever 37. The release lever 37 preferably is constructed from spring steel wire. The release lever 37 extends through a pair of aligned bushings 89 mounted at opposite sides 90 and 91 of the shoe 33 and is bent between the bushings 89 to form an eccentric or cam 92 which passes through the bolt eye 87. As the lever 37 is manually rotated by means of a knob 93, the eccentric or cam 92 pulls the shoe 33 and the upper housing 30 together to lock the shoe 33 in a fixed position. When the shoe 33 is locked to the upper housing 30, the release lever 37 is retained in a detent 94 to prevent accidental release of the shoe 33. By rotating the release lever 37 90° to a released position, the shoe 33 is released from the upper housing 30 to permit lineal movement of the shoe 33 in the slot 77 and, also, to permit at least a limited degree of rotational movement of the shoe 33 with respect to the upper housing 30, as shown in FIG. 8. While the lever 37 is in the released position, one or more springs 95 (two shown) located in openings 96 in the T-nut 80 bias the shoe 33 away from the T-nut 80 to permit easy adjustment of the shoe 33 in the slot 77. The shoe 33 and the housing 30 are shoen in the locked-together position in FIG. 6 and in the released position with the springs 95 biasing the shoe 33 away from the housing 30 in FIG. 7. As shown in FIG. 8, the shoe 33 may be moved upwardly to an upper position 97 or downwardly to a lower position 98 merely by sliding the released shoe 33 in the slot 77. At any given position of the shoe 33, the shoe 33 may also be rotated through at least a limited angle shown at the reference 99. Movement of the shoe 33 between the upper position 97 and the lower position 98 facilitates alignment of the shoe 33 with the spacing between two spring coils, while rotational adjustment is used for aligning the slot 35 with the spring coil 11b for maximum contact between the shoe 33 and the spring coil 11b. This rotational adjustment reduces or eliminates the exertion of unbalanced forces on the spring 11 by the tool 10 which may tend to cause the spring 11 to slip from the shoe 33.

Figure 9:
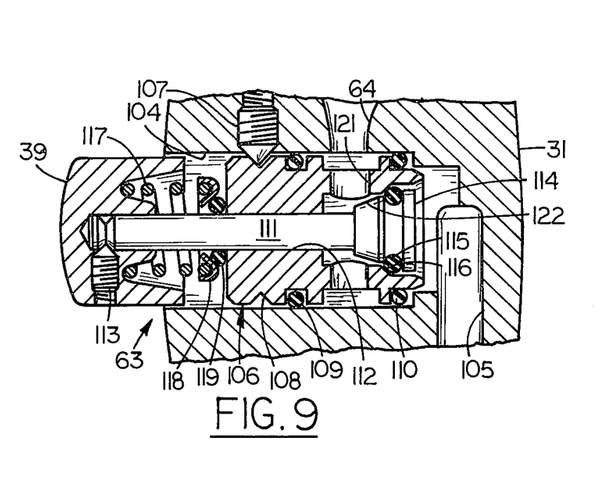
FIG. 9 is an enlarged fragmentary cross-sectional view showing the pressurizing valve in a closed position.
Figure 10:
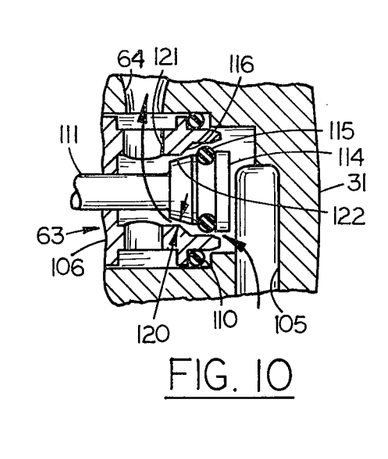
FIG. 10 is a fragmentary cross-sectional view of a portion of the pressurizing valve of FIG. 9 and showing the valve in a partially open position.
Figure 11:
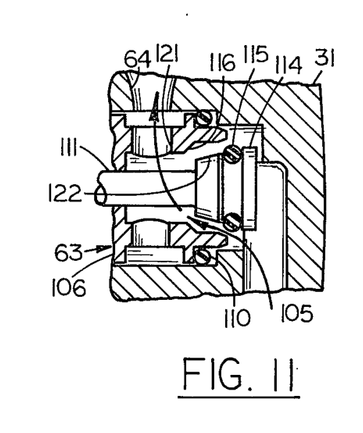
FIG. 11 is a fragmentary cross-sectional view of a portion of the valve of FIG. 9 and showing the valve in a fully open position.

Referring now to FIGS. 9-11, details are shown for the pressurizing valve 63. Although not shown in detail, the venting valve 69 is of similar construction. A cross section of the entire valve 63 is shown in FIG. 9 with the valve in the closed position. FIG. 10 shows a fragmentary portion of the valve 63 is a partially open position for supplying air to the expansion chamber 62 at a relatively low flow rate, while FIG. 11 shows the same fragmentary portion of the valve 63 in a fully open position for quickly filling the expansion chamber 62 to compress the spring 11.

The handle 31 is provided with a cylindrical opening 104 for receiving the valve 63 between an air inlet passageway 105 which communicates with the air inlet connector 38 and the passageway 64. A value housing 106 is inserted into the passageway 104 and held in place by means of a cone point set screw 107 which engages an annular groove 108 around the housing 106. The housing 106 also carries two O-ring seals 109 and 110 for forming a gas-tight seal between the housing 106 and the handle opening 104. A value stem 111 is mounted to slide within an opening 112 through the housing 106. At one end, the value stem 111 is attached to the pressurizing valve actuator button 39 by means of a set screw 113 and, at the other end, the valve stem 111 is attached to a head 114. The head 114 mounts an O-ring seal 115 which is normally biased into engagement with a seat 116 formed in the housing 106 by a spring 117 positioned between the button 39 and the housing 106. Between the spring 117 and the housing 106, a concave washer 118 and an O-ring 119 are located. The washer 118 is shaped to exert a force on the O-ring. 119 to urge the O-ring 119 against both the valve stem 111 and the housing 106. The O-ring 119 functions not only to provide a seal for preventing air leakage between the valve stem 111 and the housing opening 112, but it also prevents dust and other contaminants from accumulating on the valve stem 111. If dust or other contaminants are allowed to accumulate on the valve stem 111, they may eventually either cause the valve stem 111 to bind in the opening 112 or, through abrasion, they may cause wear between the valve stem 111 and the opening 112 which will eventually result in air leakage.

FIG. 10 shows a fragmentary portion of the valve 63 in a partially open condition. When the button 39 is partially pressed to move the head 114 slightly away from the seat 116, compressed air flows from the passageway 105 through a variable restriction area 120 into an interior opening 121 in the housing 106 which communicates with the passageway 64. Gradual movement of the valve button 39 from its initially released position gradually increases the size of the variable restriction area 120 to provide a controlled increase in the air flow into the passageway 64. The variable restriction area 120 is defined on one side by the valve seat 116 and on the inside by a throttle ramp 122 formed on the actuator head 114. The throttle ramp 122 has the configuration of a frustrum of a right cone. it will be noted that the throttle ramp 122 has a relatively short dimension in the direction of movement of the valve stem 111 and valve head 114. This dimension determines the first region in which gas flow through the valve 63 is at a controlled low flow rate. In this region, the flow rate gradually increases as the valve stem 111 is moved from the closed position shown in FIG. 9.

As the throttle ramp 122 is moved further from the position shown in FIG. 10 to the position shown in FIG. 11, the throttle ramp 122 moves away from the seat 116 into a second region wherein there is a large increase in air flow to the expansion chamber 62. Through the design of the valve seat 116 and the throttle ramp 122, an operator of the tool 10 may push the valve actuator button 39 a short distance within the first region for supplying a controlled low flow rate of air to the expansion chamber 62 for slowly compressing the spring 11, or the operator may move the actuator button 39 further into the second region to supply a greatly increased flow rate to the expansion chamber 62 for rapidly compressing the spring 11. As indicated above, the vent valve 69 is of a similar construction to the pessurizing valve 63. Thus, the operator may also either slowly vent the expansion chamber 62 to slowly release the spring 11 or he may rapidly vent the expansion chamber 62 for rapidly releasing the spring 11. The design of the valves 63 and 69 permit accurate control of the pressurizing and venting by the operator.

Figure 12:
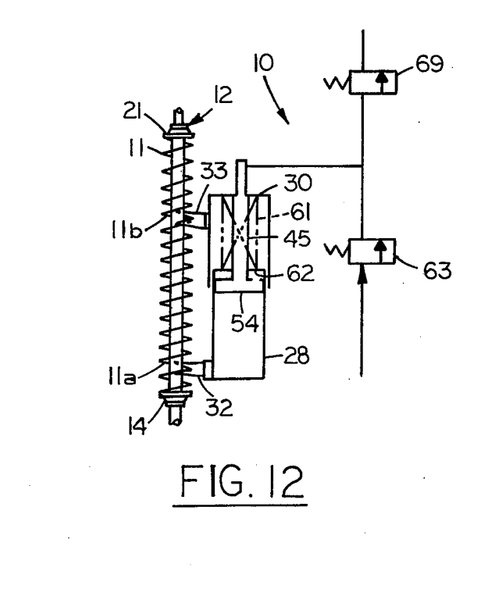
FIG. 12 is a pictorial diagram showing air flow in the compressor tool of the present invention with both the pressurizing valve and the venting valve closed.
Figure 13:
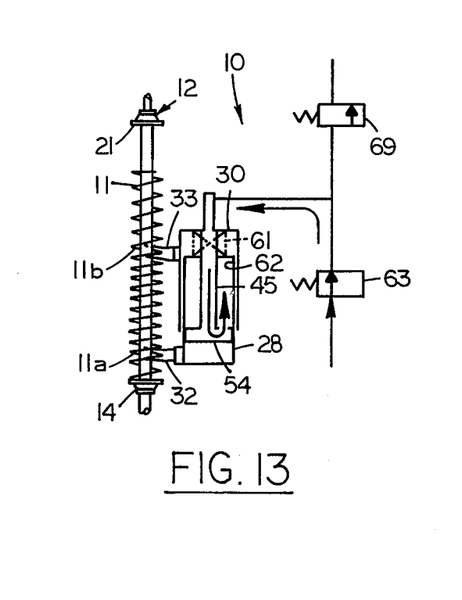
FIG. 13 is a pictorial diagram showing air flow in the compressor tool of the present invention with the pressurizing valve in an open position and the venting valve in a closed position.
Figure 14:
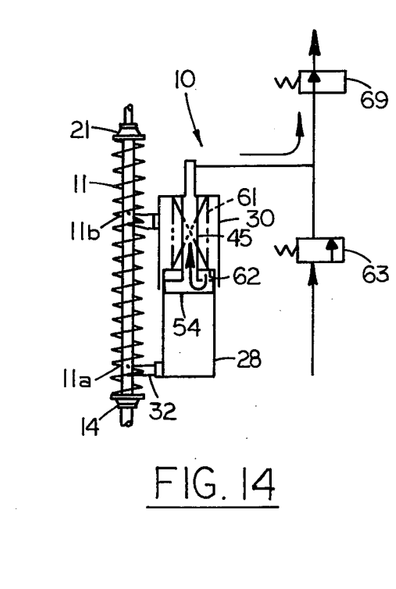
FIG. 14 is a pictorial diagram showing air flow in the compressor tool of the present invention with the pressurizing valve in a closed position and the venting valve in an open position.

Turning now to FIGS. 12–14, operation of the tool 10 is shown pictorially. Initially, the tool 10 is in its unactuated position, as shown in FIG. 12, with the piston 54 at the top of the cylinder 28 and the expansion chamber 62 having a minimum dimension. The tool 10 is moved into engagement with the MacPherson strut assembly 12 with the lower shoe 32 aligned with the spring coil 11a and the upper shoe 33 aligned with the spring coil 11b. Both the pressurizing valve 63 and the venting valve 69 are in the unactuated setting. Next, the operator presses the button 39 for actuating the pressurizing valve 63, allowing air to flow from the external air source through the piston rod 45 into the expansion chamber 62. As air flows into the expansion chamber 62, the piston 54 is moved downwardly in the cylinder 28. At the same time, the shoes 32 and 33 are moved together to compress the spring, moving the spring 11 away from the upper spring platform 21. The MacPherson strut assembly 12 is then serviced while the spring 11 is maintained compressed by the tool 10. Two methods are available for servicing the MacPherson struct suspension assembly 12. According to a first method, the spring 11 is compressed between the shoes 32 and 33 of the tool 10 while the assembly 12 remains under the vehicle panel 24. The shock absorber cartridge is then removed and replaced through an opening 24' in the vehicle panel 24. According to a second method, after the spring 11 is compressed with the tool 10 and after disconnecting from the vehicle panel 24, the suspension assembly 12 and the tool 10 are lowered to clear the vehicle panel 24. The suspension assembly 12 is then angled to allow the compressed spring 11 to be removed from the suspension assembly 12. After replacing the shock absorber cartridge, the compressed spring is repositioned on the assembly 12 and the assembly 12 is reconnected to the vehicle panel 24. After servicing, the operator actuates the venting valve 69 as shown in FIG. 14 to allow air to flow from the expansion chamber 62 through the piston rod 45, through the valve 69 and the air is vented to the atmosphere. As air is vented from the expansion chamber 62, the piston 54 moves upwardly in the cylinder 28 to release the spring 11. After the spring 11 is released, the tool 10 is lifted from the strut assembly 12. If the strut assembly 12 is serviced in the car, this completes the servicing operation. Or, if the strut assembly 12 is removed from the car for servicing, the assembly 12 is returned to the vehicle to complete the servicing operation.

Figure 15:
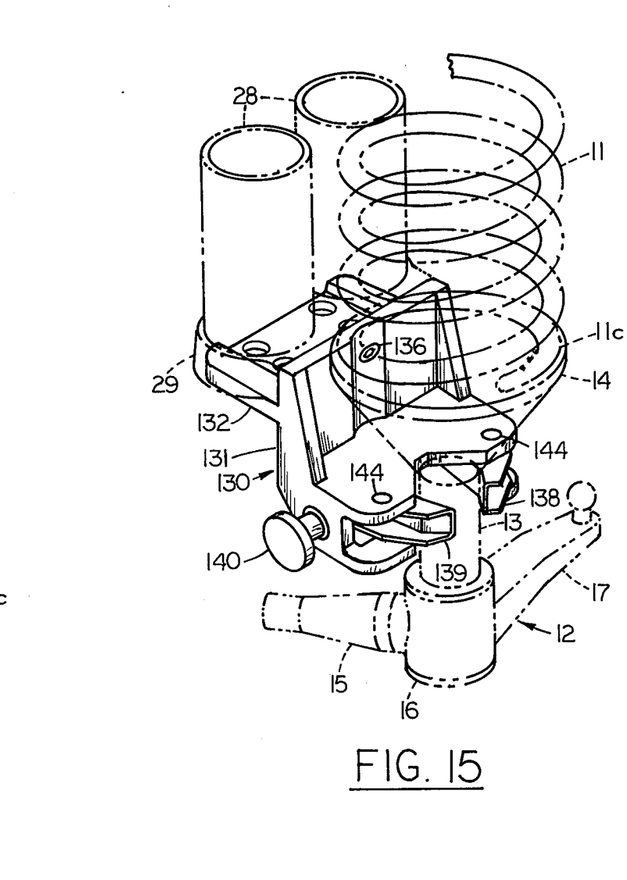
FIG. 15 is a perspective view of a bench-mounted adapter for use with the compressor tool of the present invention for clamping onto the lower end of a MacPherson-type strut suspension assembly while compressing the coil spring in such assembly.

In some cases, it is either necessary or desirable to service the MacPherson-type suspension strut assembly 12 after removing the assembly 12 from a vehicle. In some cases, for example, insufficient work space is present in the vehicle for servicing the assembly 12 in situ. In such cases, the entire assembly 12 is removed from the vehicle prior to servicing. When the assembly 12 is serviced after removing from the vehicle, it may be desirable to have a bench-mounted spring compressor tool. Therefore, an adapter 130 is provided for mounting the tool 10 on bench. The bench-mounted adapter 130 is attached to the tool bracket 29 in the slot 76 in place of the lower shoe 32. The adapter 130 is designed to engage the shock absorber housing 13 below the lower spring platform 14, rather than engaging a spring coil 11a as in the case of the lower shoe 32. The upper shoe 33 remains attached to the upper tool housing 30 for engaging the spring coil 11b. During compression of the spring 11, forces are exerted on the spring 11 by the tool 10 between the coil 11b and the lowermost spring coil 11c which rests upon the lower spring platform 14.

Figure 16:
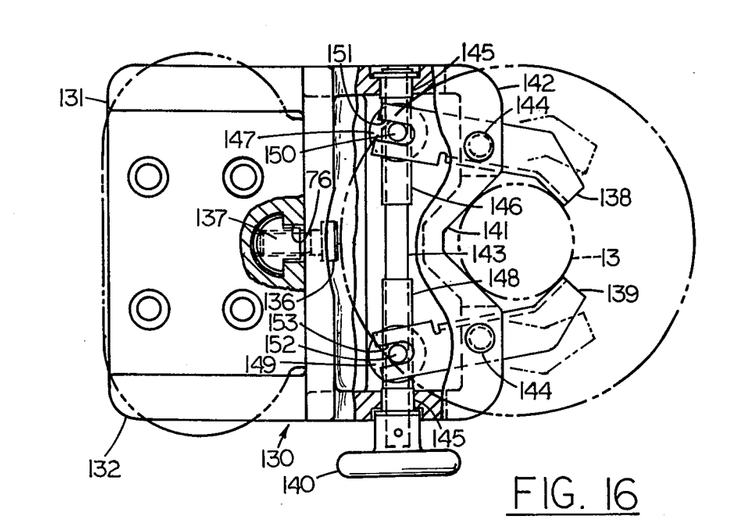
FIG. 16 is top elevational view, in partial section, of the bench-mounted adapter of FIG. 15.
Figure 17:
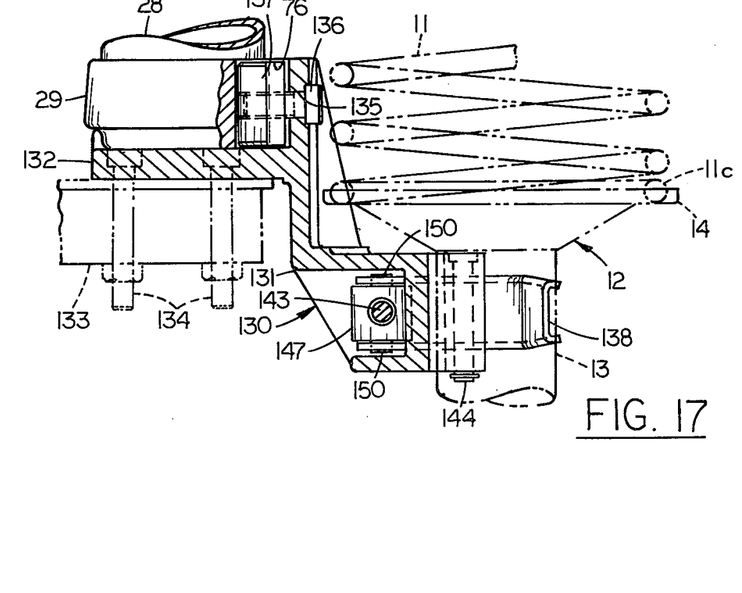
FIG. 17 is a side elevational view, in partial section, of the bench adapter of FIG. 15.

The bench-mounted adapter 130 includes a bracket 131 having an integral horizonal flange 132 which is attached to a bench 133 by means of bolts 134 or other suitable fasteners. Above the flange 132, the hole 135 is formed in the bracket 131 for receiving a screw 136. The screw 136 is threaded into a T-nut 137 similar to the T-nut used to attach the lower shoe 32 to the bracket 29 which mounts the cylinders 28. The bracket 29 is positioned on the flange 132 with the T-nut 137 located in the slot 76 and the screw 136 is tightened to rigidly connect the bracket 29 to the bench-mounted adapter 130.

The MacPherson-type strut suspension assembly 12 is attached to the adapter 130 by means of a pair of clamping levers 138 and 139 which clamp onto the shock absorber housing 13 below the lower spring platform 14. As a knob 140 is rotated, the clamping levers 138 and 139 clamp the shock absorber housing 13 against a notch 141 formed in a side 142 of the adapter 130. The knob 140 rotates a screw 143 which simultaneously pivots the clamping levers 138 and 139 either towards or away from the shock absorber housing 13. Each of the clamping levers 138 and 139 is attached to the adapter bracket 131 by means of a gudgeon pin 144. The gudgeon pins 144 restrict the levers 138 and 139 to rotational movement about a vertical axis defined by such pins 144. The screw 143 is attached to the bracket 131 by means of bushings 145 which permit the screw 143 to rotate. The screw 143 includes a right-hand threaded portion 146 which engages a correspondingly right-hand threaded nut 147 and also includes a left-hand threaded portion 148 which engages a correspondingly left-hand threaded nut 149. The nut 147 includes cylindrical projections 150 which fit into slots 151 on the clamping lever 138 and the nut 149 includes similar projections 152 which fit into slots 153 on the clamping lever 139. As the knob 140 is rotated in a clockwise direction, the nuts 147 and 149 are moved towards each other, thereby pivoting the clamping levers 138 and 139 away from the shock absorber housing 13. Conversely, rotating the knob 140 in a counterclockwise direction moves the nuts 147 and 149 apart to pivot the clamping levers 138 and 139 towards the shock absorber housing 13 for clamping such housing 13 against the notch 141.

In operation, the bench-mounted adapter 130 may be attached to the bench 133 and the tool 10 is then attached to the adapter 130. The MacPherson-type strut suspension assembly 12 to be serviced is removed from the vehicle in which it is mounted and is attached to the adapter 130 by rotating the knob 140 to clamp the shock absorber housing 13 firmly to the adapter 130. The upper shoe 33 on the tool 10 is then adjusted by releasing the lever 37 so that the shoe 33 engages the spring coil 11b. The lever 37 is then moved to lock the shoe 33 firmly onto the upper housing 30. The operator next presses the pressurizing valve button 39 to cause the tool 10 to compress the spring 11 between the lowermost coil 11c and the coil 11b. The spring may be left in this compressed state while the operator services the MacPherson assembly 12. Subsequent to servicing and rebuilding of the MacPherson assembly 12, the operator presses the vent valve button 40 to release the spring 11. The knob 140 is then rotated to remove the assembly 12 from the bench-mounted adapter 130 and the MacPherson assembly 12 is then reinstalled in the vehicle.

The tool 10 with the adapter 130 attached to the slot 76 in place of the lower shoe 32 also may be used as a protable tool for compressing a spring in situ. The adapter 130 is clamped onto the lower shock absorber housing 13 while the MacPherson strut suspension assembly 12 remains attached to the vehicle panel 24. The tool 10 is then used to compress the spring 11. The shock absorber cartridge is removed and replaced through the opening 24' in the vehicle panel 24. After replacing the cartridge, the spring is released and the adapter 130 is loosened for removing the tool 10.

Although the tool 10 has been described specifically for compressing a spring in a MacPherson-type strut suspension assembly, it will be understood that the tool 10 is also useful for compressing springs for other purposes and in other types of assemblies. It also will be appreciated that various modifications and changes may be made in the above-described preferred embodiments of the invention without departing from the spirit and the scope of the following claims.

I claim:

1. A spring compressor tool for compressing a spring having opposed ends, comprising, in combination, a first pressure shoe having a generally U-shaped helical portion, said helical portion defining a slot, said slot receiving a first coil of such spring at a position intermediate such opposed spring ends for applying a force to such first spring coil, means for applying an opposing force to a second coil of such spring, means for adjusting said pressure shoe for aligning said slot with such first spring coil, said adjusting means including means for infinitely varying the position of said pressure shoe toward and away from said force applying means, and compression drive means positioned between said pressure shoe and said force applying means for moving said pressure shoe and said force applying means toward one another along a linear path to compress the portion of such spring located between said pressure shoe and said force applying means.

2. A spring compressor tool, as set forth in claim 1, wherein said adjusting means further includes means for rotatably adjusting said pressure shoe for substantially continuous engagement of said slot with such first spring coil.

3. A spring compressor tool, as set forth in claim 1, wherein said force applying means comprises means for applying a force to such second coil of such loaded spring located at an end of such spring.

4. A spring compressor tool, as set forth in claim 1, wherein said compression drive means includes at least one pneumatic cylinder connected between said pressure shoe and said force applying means, a source of compressed gas, and manually actuated pressurizing valve means for supplying a flow of such compressed gas to said cylinder, said pressurizing valve means including an actuator which is manually positionable in first and second regions, means responsive to said actuator being positioned in said first region for supplying compressed gas at a controlled low flow rate and means responsive to said actuator being positioned in said second region for supplying compressed gas at a high flow rate.

5. A spring compressor tool, as set forth in claim 4, and further including vent valve means for venting gas from said cylinder, said vent valve means including an actuator which is manually positionable in first and second regions, means responsive to said actuator being positioned in said first region for venting gas at a controlled low flow rate and means responsive to said actuator being positioned in said second region for venting gas at a high flow rate.

6. A spring compressor tool for compressing a spring having opposed ends, comprising, in combination, a first pressure shoe having a generally U-shaped helical portion, said helical portion defining a slot, said slot receiving a first coil of such spring at a position intermediate such opposed spring ends for applying a force to such first spring coil, means for applying an opposing force to a second coil of such spring, means for adjusting said pressure shoe for aligning said slot with such first spring coil, said adjusting means including means for adjusting the position of said pressure shoe linearly toward and away from said force applying means, said adjusting means further including means for rotatably adjusting said pressure shoe for substantially continuous engagement of said slot with such first spring coil, and compression drive means positioned between said pressure shoe and said force applying means for moving said pressure shoe and said force applying means toward one another to compress the portion of such spring located between said pressure shoe and said force applying means.

7. A spring compressor tool, as set forth in claim 6, wherein said force applying means comprises means for applying a force to such second coil of such loaded spring located at an end of such spring.

8. A spring compressor tool, as set forth in claim 6, wherein said compression drive means includes at least one pneumatic cylinder connected between said pressure shoe and said force applying means, a source of compressed gas, and manually actuated pressurizing valve means for supplying a flow of such compressed gas to said cylinder, said pressurizing valve means including an actuator which is manually positionable in first and second regions, means responsive to said actuator being positioned in said first region for supplying compressed gas at a controlled low flow rate and means responsive to said actuator being positioned in said second region for supplying compressed gas at a high flow rate.

9. A spring compressor tool, as set forth in claim 8, and further including vent valve means for venting gas from said cylinder, said vent valve means including an actuator which is manually positionable in first and second regions, means responsive to said actuator being positioned in said first region for venting gas at a controlled low flow rate and means responsive to said actuator being positioned in said second region for venting gas at a high flow rate.

10. A spring compressor tool, as set forth in claim 6, wherein such second spring coil is at a position intermediate such opposed spring ends, wherein said force applying means comprises a second pressure shoe spaced from said first pressure shoe, said second pressure shoe having a helical portion defining a second slot, said second slot receiving such second spring coil, and further including means for rotatably adjusting said second shoe for substantially continuous engagement of said second slot with such second spring coil.

11. A spring compressor with such for compressing a spring having opposed ends, comprising, in combination, a first pressure shoe having a generally U-shaped helical portion, said helical portion defining a slot, said slot receiving a first coil of such spring at a position intermediate such opposed spring ends for applying a force to such first spring coil, means for applying an opposing force to a second coil of such spring, means for adjusting said pressure shoe for aligning said slot wth such first spring coil, said adjusting means including means for rotatably adjusting said pressure shoe for substantially continuous engagement of said slot such first spring coil, and compression drive means positioned between said pressure shoe and said force applying means for moving said pressure shoe and said force applying means toward one another to compress the portion of such spring located between said pressure shoe and said force applying means.

12. A spring compressor tool for compressing a spring having opposed ends, comprising, in combination, a first pressure shoe having a generally U-shaped helical portion, said helical portion defining a slot, said slot receiving a first coil of such spring at a position intermediate such opposed spring ends for applying force to such first spring coil, means for applying an opposing force to a second coil of such spring, means for adjusting said pressure shoe for aligning said slot with such first spring coil, such second spring coil being at a position intermediate such opposed spring ends, said force applying means comprising a second pressure shoe spaced from said first pressure shoe, said second pressure shoe having a helical portion defining a second slot, said second slot receiving such second spring coil, said adjusting means including means for rotatably adjusting one of said first and second shoes for substantially continuous engagement of the respective slot with the respective spring coil, and compression drive means positioned between said pressure shoe and said force applying means for moving said pressure shoe and said force applying means toward one another to compress the portion of such spring located between said pressure shoe and said force applying means.

13. A portable spring compressor tool for compressing a loaded spring having opposed ends, comprising, a first pressure shoe having a generally U-shaped helical portion, said helical portion having inner and outer walls defining a continuous first slot which extends at least 180°, said first slot receiving a coil of such loaded spring at a position intermediate such opposed ends, a second pressure shoe spaced from said first pressure shoe, said second pressure shoe having a helical portion having inner and outer walls defining a continuous second slot receiving another coil of such loaded spring at a portion intermediate such opposed ends, at least one fluid cylinder including a cylinder body, a piston positioned to slide within said cylinder body and a piston rod attached to said piston, means limiting said piston rod to linear movement as said attached piston is moved in said cylinder body, said cylinder body and said piston defining a fluid chamber, means attaching said first shoe to said piston rod, means attaching said second shoe to said cylinder body, means for adjusting one of said first and second pressure shoes for aligning the respective slot with a spring coil of such loaded spring, said adjusting means including means for adjusting the position of said one of said first and second pressure shos linearly toward and away from the other one of said first and second pressure shoes, means for supplying pressurized fluid to said fluid chamber to move said piston in said cylinder body, said first shoe moving toward said second shoe along a linear path to compress such spring as such pressurized fluid moves said piston, means for venting fluid from said fluid chamber, and return means for urging said first and second shoes apart whereby such loaded spring is compressed without removing such spring from place.

14. A spring compressor tool, as set forth in claim 13, wherein said adjusting means further includes means for rotatably adjusting said one of said first and second pressure shoes for substantially continuous engagement of such respective slot with the spring coil.

\* \* \* \* \*

UNITED STATES PATENT AND TRADEMARK OFFICE
CERTIFICATE OF CORRECTION

PATENT NO. : 4,034,960
DATED : July 12, 1977
INVENTOR(S) : Kenneth D. Kloster

It is certified that error appears in the above-identified patent and that said Letters Patent are hereby corrected as shown below:

```
In the specification:
Col. 4, line 16, insert --and-- before "an".
  "    ",   "  17, "29" should be 49.
Col. 6, line 14, "shoen" should be shown.
  "    ",   "  38, "is" should be in.
  "    ",   "  47, "value" should be valve.
  "    ",   "  53, "value" should be valve.
  "    ",   "  55, "value" should be valve.
Col. 7, line 24, "it" should be It.
  "    ",   "  47, "pessurizing" should be pressurizing.
Col. 8, line  6, "struct" should be strut.
  "    ",   "  43, after "on", insert --a--.
  "    ",   "  56, "horizonal" should be horizontal.
  "    ",   "  58, "the hole" should be a hole.
Col. 9, line 56, "protable" should be portable.

In the claims:
Col. 11, line 46, insert --tool-- after "compressor", and
                  delete "with such".
  "     ",   "  58, insert --with-- after "slot".
Col. 12, line  6, insert --a-- after "applying".
  "     ",   "  36, "portion" should be position.
  "     ",   "  49, "shos" should be shoes.
```

Signed and Sealed this

Sixth Day of December 1977

[SEAL]

Attest:

RUTH C. MASON
Attesting Officer

LUTRELLE F. PARKER
Acting Commissioner of Patents and Trademarks